United States Patent
Lin et al.

(10) Patent No.: US 9,706,085 B1
(45) Date of Patent: Jul. 11, 2017

(54) INTELLIGENT SPOT COLOR RECIPE PICKER FOR DIGITAL FRONT END

(71) Applicant: Xerox Corporation, Norwalk, CT (US)

(72) Inventors: Guo-Yau Lin, The Woodlands, TX (US); James Michael Sanchez, Rochester, NY (US); Michael R. Campanelli, Webster, NY (US); David C. Robinson, Penfield, NY (US); Raju Seetharam, Pittsford, NY (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/160,617

(22) Filed: May 20, 2016

(51) Int. Cl.
  *H04N 1/60* (2006.01)
(52) U.S. Cl.
  CPC ......... *H04N 1/6066* (2013.01); *H04N 1/6008* (2013.01); *H04N 2201/0094* (2013.01)
(58) Field of Classification Search
  CPC .................................................. H04N 1/6066
  See application file for complete search history.

(56) References Cited

U.S. PATENT DOCUMENTS

| 5,687,300 A * | 11/1997 | Cooper | H04N 1/54 358/1.9 |
| 2008/0291479 A1* | 11/2008 | Mestha | G03G 13/01 358/1.9 |
| 2010/0265522 A1* | 10/2010 | Dalal | H04N 1/603 358/1.9 |

* cited by examiner

Primary Examiner — Ibrahim Siddo
(74) Attorney, Agent, or Firm — Fay Sharpe LLP

(57) ABSTRACT

A system and method for automatic selection of at least one spot color to be processed by a digital image press includes identifying process colorants to determine principal and extended gamuts thereof. Spot color recipes of the principal and extended gamuts are retrieved from a spot color library, along with a set of attributes corresponding to use of colorants by the digital image press. For each spot color recipe, a combined attribute score is calculated relating to the principal gamut and the extended gamut, spot color recipe of the extended gamut or principal gamut is then identified for use based upon which has the higher combined attribute score. The spot color library is then updated in accordance with the identified recipe for production of each spot color. Print jobs are then output with the appropriate spot color recipe automatically selected.

13 Claims, 11 Drawing Sheets

| | COLOR DESCRIPTION | COLOR NAME | CMYK | CMYKV | USE EXTENDED GAMUT RECIPE |
|---|---|---|---|---|---|
| | YELLOWISH | PANTONE 101 C | 1,3,66,0 | 1,3,66,0,0 | ☐ |
| | MIDTONE PINKISH | PANTONE 237 C | 1,4,55,3,0 | 0,52,0,0,2 | ☐ |
| | PURPLISH | PANTONE 259 C | 60,95,0,10 | 0,62,0,26,75 | ☐ |
| | DARK BLUISH | PANTONE VIOLET C | 95,100,0,0 | 59,49,0,0,100 | ☒ |
| | LIGHT GRAYISH | PANTONE COOL GRAY 5 C | 31,24,22,0 | 31,24,22,0,0 | ☐ |

FIG. 2

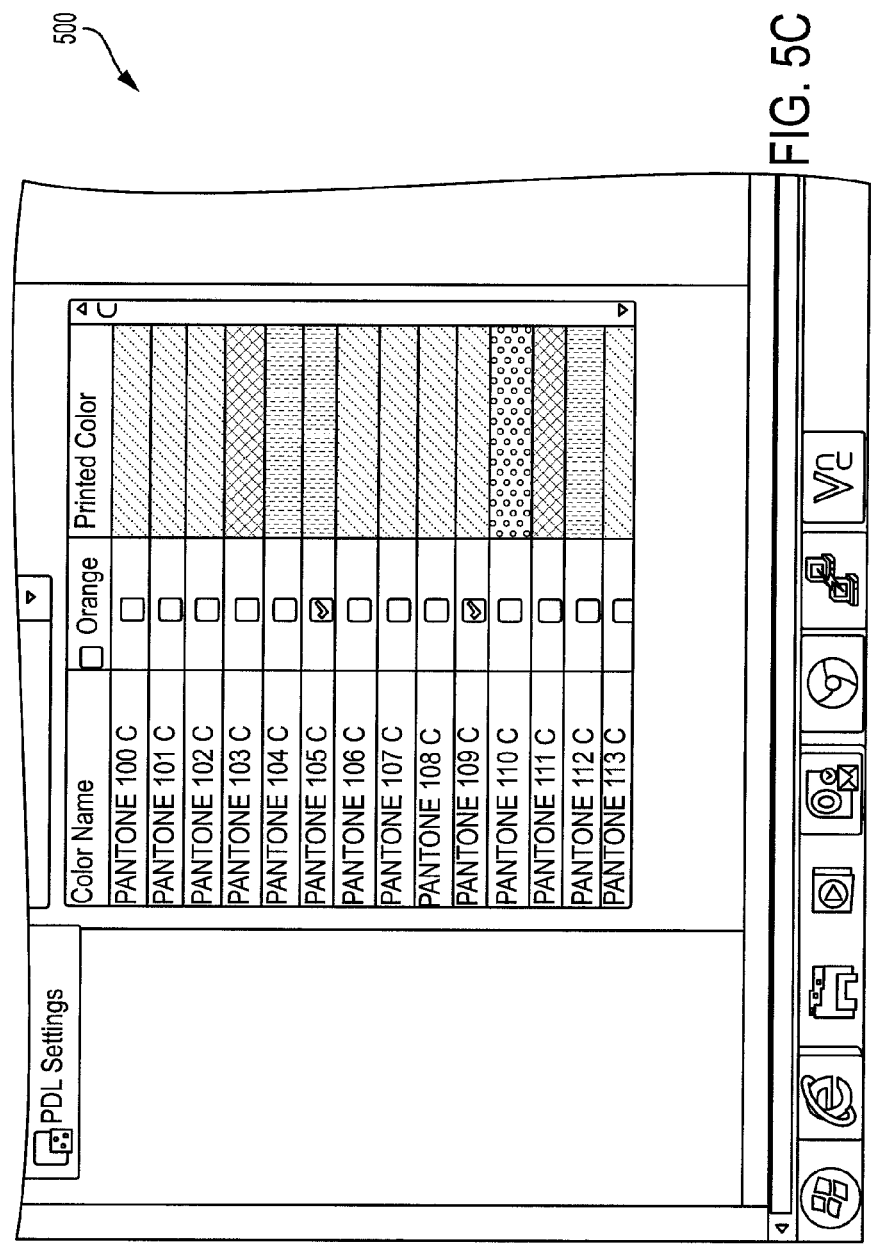

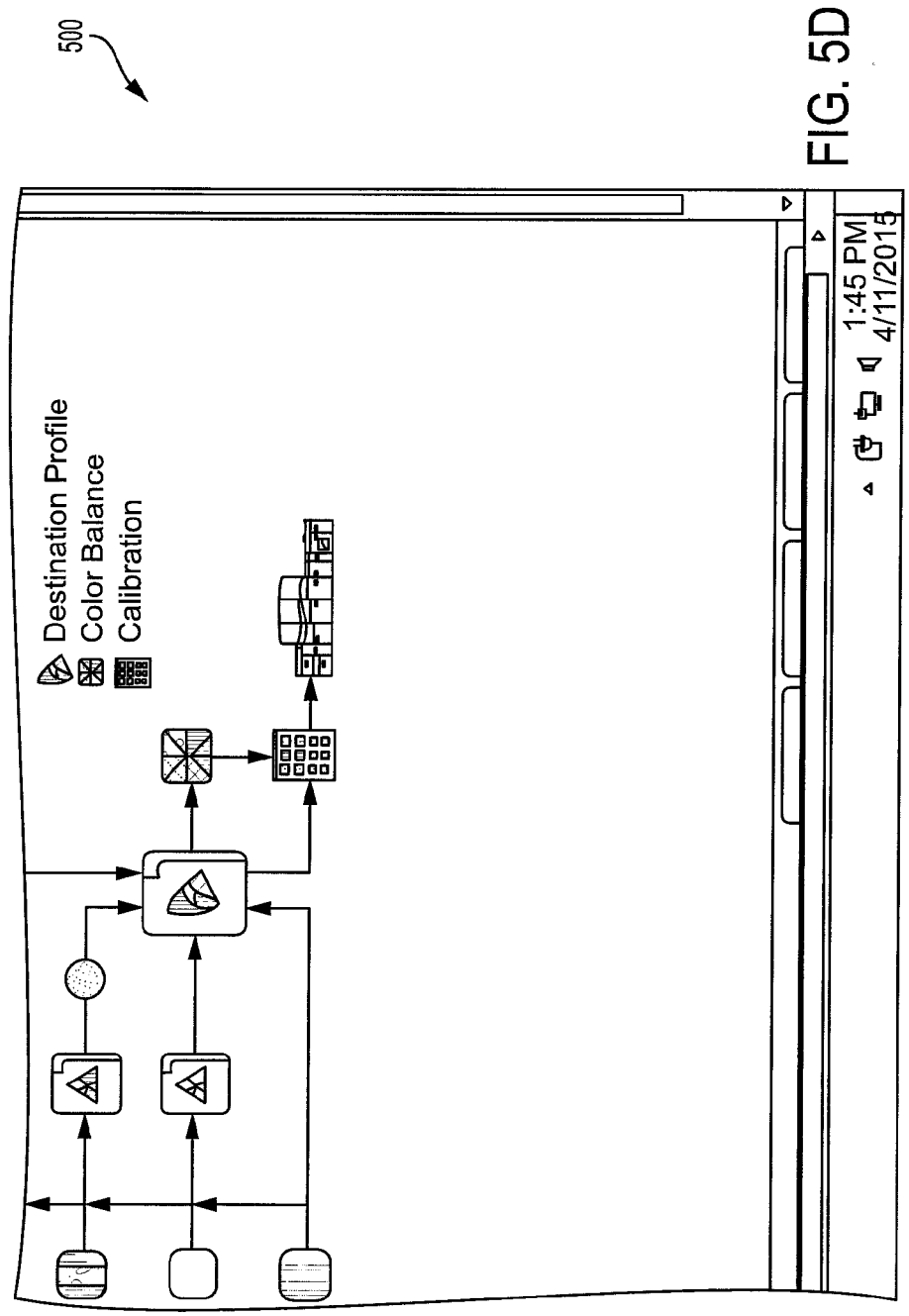

```
"Name" : MYOrangelist {
    "Setting" : "CMYK",
    "Mode": "Extended Gamut Orange",
    "ColorNames" : { "PANTONE 100 U" :
                     "PANTONE 100 U",
                     "PANTONE 101 U" :
                     "PANTONE 101 U"
                   }
}
```

FIG. 7

```
Case 1: user selects use CMYK all Spot Colors
"CMYKSpotColorNames" : {
        "Settings" : "CMYK",
}
case 2: user selects use Extended for all Spot Colors
"CMYKSpotColorNames" : {
        "Settings" : "Extended",
} case 3: user selects CMYK for spots, with the exception of
Extended for "Pantone 100 U" and "PANTONE 101 U"
"CMYKSpotColorNames" : {
                        " Settings" : "CMYK",
                                "ColorNames" : {
                                                "PANTONE 100 U" :
"PANTONE 100 U",
                                                "PANTONE 101 U" :
"PANTONE 101 U"
                                                }
                } case 4: user selects Extended for spots, with the exception of
CMYK for "Pantone 100 U" and "PANTONE 101 U"
"CMYKSpotColorNames" : {
                        " Settings" : " Extended ",
                                "ColorNames" : {
                                                "PANTONE 100 U" :
"PANTONE 100 U",
                                                "PANTONE 101 U" :
"PANTONE 101 U"
                                                }
    }
```

FIG. 8

INTELLIGENT SPOT COLOR RECIPE PICKER FOR DIGITAL FRONT END

BACKGROUND

The subject disclosure relates to the printing arts, the image processing arts, the color processing arts, spot color printing, and the like.

A spot color is generally a color used in printing that differs from a process color. The standard process colors, cyan, magenta, yellow, and black (CMYK) are typically combined as needed to create the colors of an output document. In some instances, a particular color, which would normally be created by combining CMYK, is added to a printer as a fifth (or sixth) colorant, avoiding wasteful combination of CMYK inks. For example, a company may have a special color as part of its logo. To keep costs down in printing literature, the company may employ a five or six color printer, with the special color of the logo included as a single colorant. A spot colorant is intended to be used alone and to represent a particular end color, whereas the standard CMYK colors are intended to be combined to form an end color. In a typical six-color offset printing press, the press would include four process colors and two spot colors to hit specific important colors like a company logo, or the like. In digital printing, spot colors (colors that would have been printed using a single ink) are emulated using a spot color recipe.

For emulating spot colors on a modern digital press that supports additional spot colorant(s) besides the traditional colorants, i.e. CMYK (Cyan, Magenta, Yellow, and Black), a common solution is for DFE (Digital Front End) to let user control if the spot colors will be rendered in CMYK or CMYK plus the additional colorant. This control can be set for the entire spot color library, or for each spot color. However, setting this attribute for each spot color can be tedious and error-prone. When the target device changes, e.g. a destination update, or a different output colorant set is selected, the recipes will change and the previous determined attributes will become out-of-date.

Continuing with the digital printing example, when four color printing (e.g., CMYK) is augmented with one or more extended gamut colorants, it is the common case that users of such digital printing either do not know what spot color "benefits" from the loaded, in use, extended gamut, OR, the users must laboriously manually select a spot color that is known to benefit. Additionally, it is common that users are unable to assess the job for the optimal extended gamut colorant if it is not loaded.

On DFEs, Spot Colors are rendered with the special recipes defined by the system. Users occasionally might want to change the system defined recipes, by a means such as a Spot Color Editor, which in general is a DFE UI feature. When the job is sent, if the spot colors called out in the job are modified in the spot color editor, the user defined recipes will be used. However, there are usually thousands of spot colors that are supported on the system. It is hard for a user to scroll down the list, skip those unrelated colors, and find the spot colors that he or she wants to modify. Some filtering mechanism would help, but that still takes some effort for the user to perform the filtering.

Currently DFEs enable the setting of one color mode (e.g., CMYK) with one destination profile on a job/queue/page exception. For extended gamut printing systems (e.g., Edmonton), users do not want to apply all 5 colorants to all objects on a page/job. The reasons could be image quality or cost considerations.

What is needed is a system that enables users to specify the colorants and associated destination profile for each object type within an extended gamut mode rendered page. Furthermore, the user needs to be able to control the colorants and associated destination profile for each individual spot name.

BRIEF DESCRIPTION

According to one embodiment, there is provided a method for automatic selection of at least one spot color to be processed by a digital image press. The method includes, with a processor, identifying process colorants of the digital image press to determine at least one of a principal gamut and an extended gamut of the digital image press. The method further includes retrieving, from a data storage in communication with the processor, a spot color library of spot color recipes for production of the corresponding spot colors, the spot color recipes corresponding to the at least one of the principal gamut and the extended gamut. The method also includes retrieving a set of attributes corresponding to use of colorants by the digital image press. For each spot color recipe, the method includes calculating a combined attribute score relating to the principal gamut and the extended gamut, identifying the spot color recipe of the extended gamut for use by the digital image press in response to the extended gamut spot color recipe having a higher combined attribute score than the corresponding principal gamut spot color recipe, identifying the spot color recipe of the principal gamut spot color recipe for use by the digital image press in response to the principal gamut spot color recipe having a higher combined attribute score than the corresponding extended gamut spot color recipe, and updating the spot color library in accordance with the identified recipe for production of each spot color. The method further includes communicating, via a communications link, to a display device, the updated spot color library.

According to another embodiment, there is provided a system for automatic spot color recipe selection on a digital image press. The system includes a digital image press having a principal gamut and an extended gamut, the digital image press including a processor and memory in communication therewith. The system further includes a data storage in communication with the processor of the digital image press, the data storage storing a spot color library. The memory of the system stores instructions which are executed by the processor to, for each of a plurality of spot colors, identify, via a recipe identification module, a spot color recipe corresponding to the standard gamut and at least one spot color recipe corresponding to the extended gamut. The memory also stores instructions to calculate, via a combined attribute scoring module, a combined attribute score for the standard gamut spot color recipe and a combined attribute score for the at least one extended gamut spot color recipe, and to select a spot color recipe corresponding to the standard gamut spot color recipe or the at least one extended gamut spot color recipe in accordance with the combined attribute score, wherein the selected spot color recipe is the recipe having a highest combined attribute score. In addition, the memory stores instructions to update the spot color library in accordance with the selected spot color recipe.

In another embodiment, there is provided a computer-implemented method for automatically selecting spot color recipes for use by a digital image press in outputting a print job. The computer-implemented method includes receiving a document processing job inclusive of at least one spot color contained therein, and receiving from a graphical user interface in communication with the processor, selection data corresponding to a job type associated with a document processing job. The method further includes retrieving, from an associated data storage, a spot color library of spot color recipes for production of the corresponding at least one spot color, the spot color recipes corresponding to the at least one of a principal gamut recipe and an extended gamut recipe, and retrieving, from the data storage, a plurality of attributes corresponding to spot color usage, the plurality of attributes selected from the group comprising accuracy, utilization of extended colorant, halftone smoothness, visibility of halftone moiré, and ink usage. The method also includes retrieving, from the data storage, a plurality of attribute weightings associated with the job type corresponding to the plurality of attributes, and applying, to the spot color recipes in the data storage, the retrieved attribute weightings to the corresponding attributes associated therewith so as to calculate the combined attribute score for the spot color recipes. The computer-implemented method also automatically selects at least one spot color recipe in accordance with the combined attribute score for use in processing the document processing job, and outputs the document processing job by the digital image press utilizing the at least one selected spot color recipe.

BRIEF DESCRIPTION OF THE DRAWINGS

FIG. 2 is table illustrating ICC color profiles and recipes for spot colors for use by the spot color selection system for spot color processing by a digital image press in accordance with one embodiment of the subject application.

FIGS. 5A-5D is an example illustration of a graphical user interface for use in the system for spot color selection in accordance with one embodiment of the subject application.

FIG. 7 provides an illustration of a suitable short-cut created in accordance with one embodiment of the subject application.

FIG. 8 is an example of a JSON spot file utilized by the graphical user interface for the spot color selection system in accordance with one embodiment of the subject application.

DETAILED DESCRIPTION

Figure 1:
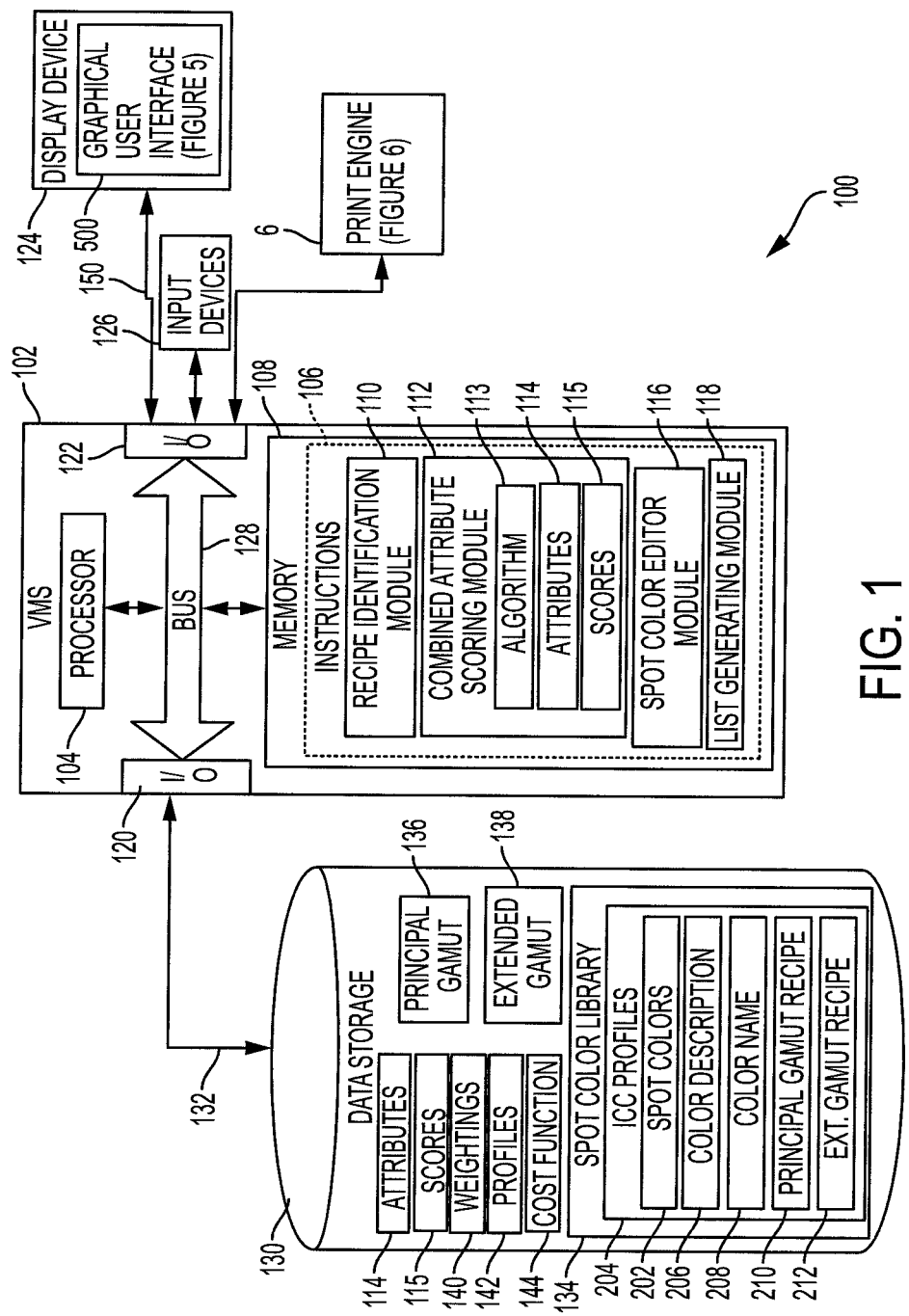
FIG. 1 is an illustration of a spot color selection system for spot color processing by a digital image press in accordance with one embodiment of the subject application.

One or more embodiments will now be described with reference to the attached drawings, wherein like reference numerals are used to refer to like elements throughout. Aspects of exemplary embodiments related to systems and methods for spot color selection are described herein. In addition, example embodiments are presented hereinafter referring to automated spot color selection, color editing, and the like, however, application of the systems and methods set forth can be made in other areas, as will be appreciated by those skilled in the art.

As briefly discussed above, there is provided systems and methods for automatic spot color selection for document processing jobs. In a digital front end, i.e., a digital image press, commonly references as multifunction peripheral device, colorants (or toners) generally include cyan (C), magenta (M), yellow (Y) and black (K), collectively CMYK which are used in varying combinations to create output colored hardcopies of input images/documents. Some digital image presses utilize a fifth or sixth colorant (X), collectively CMYKX, which expands the colors capable of being reproduced by the digital image press. Spot colors, as discussed above, are generally used for a specific color that a user requires, e.g., a particular shade of green for a tractor company. In such circumstances, repetitive use of this color may warrant the use of a separate colorant of that color, or an additional colorant that may be combined with the standard process colorants to produce the color. So-called spot colors may be reproduced by digital image presses either as an individual colorant or based upon a recipe of colorants, both CMYK and CMYKX. The problem arises for users as to when spot colors should be used, and when used, the appropriate recipe to be used to reproduce that spot color. Accordingly, provided herein are systems and methods that enable automatic selection of spot colors, spot color recipes, a graphical user interface for describing the same to the users, and other advantages, as will be appreciated by those skilled in the art.

In accordance with one embodiment contemplated herein, there is provided a mechanism that automatically sets the attributes about whether a spot color is rendered in CMYK or CMYKX (CMYK plus additional colorant) for the entire spot color library. By providing a set of tunable rules, the systems and methods herein utilize an algorithm that will determine the optimal decision for each spot color, for the supplied destination profiles. The optimal decisions will be passed down as a job attribute. During raster image processing (RIP), the recipe for each spot color used in the job will be calculated based on the optimal decision. The automatic optimal selection can also serve as the initial selection, where the user can further modify and reach the final decision before processing the job.

Stated another way, on a digital image press, spot colors are emulated by mixing the printer colorants (CMYK). However, as will be appreciated, some spot colors are out of the traditional CMYK printer gamut, and as such cannot be achieved by mixing CMYK. By making the additional colorant X available besides CMYK, a gamut-extended printer can provide extra gamut that a traditional CMYK printer cannot. As a result, the CMYKX printer may better emulate the spot colors that are near or fall in this extra gamut. However, using the additional colorant may not be beneficial for all spot colors. For example, the colors that are far away from the chromaticity peak of the additional colorant. On the system where the CMYK profile and the CMYKX profile are both available, the user may have to choose, for each spot color, which profile to use for generating the recipe. Accordingly, the use of the tunable attribute algorithm employed by the systems and methods set forth herein alleviate this burden on the user.

With reference to FIG. 1, there is shown a system 100 for automatic spot color selection. The system 100 addresses the need for systems and methods that enable users having little to no experience with color selection to utilize spot colors for document processing, using attributes that are understandable to such users, such as image quality, costs, and the like. It will be appreciated that the various components depicted in FIG. 1 is for purposes of illustrating aspects of the exemplary hardware, software, or a combination thereof, are capable of being substituted therein.

It will be appreciated that the system 100 of FIG. 1 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a stand-alone device adapted to perform the methods described herein.

As shown in FIG. 1, the system 100 includes a computer system 102, which is capable of implementing the exemplary method described below. The computer system 102 may include a computer server, workstation, personal computer, laptop computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like. The exemplary computer system 102 includes a processor 104, which performs the exemplary method by execution of processing instructions 106 which are stored in memory 108 connected to the processor 104, as well as controlling the overall operation of the computer system 102.

The instructions 106 include a recipe identification module 110 configured to identify spot color recipes 210, 212 capable of being produced by the principal gamut 136 and/or the extended gamut 138 of colorants in the digital image press 102. In one embodiment, the recipe identification module 110 is configured to receive a combined attribute score from a combined attribute scoring module 112 (discussed below), and select the spot color recipe 210 or 212 for a particular spot color 202 based upon the score 115 of the recipe 210 or 212.

The instructions 106 further include a combined attribute scoring module 112 configured to generate a combined attribute score 115 for each spot color recipe 210, 212 in the spot color library 134 of ICC profiles 204. As discussed in greater detail below, various attributes 114 associated with spot colors 202 are weighted by the scoring module 112 in accordance with user input. The attributes 114 may include, for example and without limitation, accuracy, utilization of extended colorant, halftone smoothness, visibility of halftone moiré, ink usage, and the like. The impact of the various attributes 114 are discussed in greater detail below with respect to FIG. 3. The combined attribute scoring module 112 may utilize a suitable algorithm, shown below as equation (1), as a cost function 144, which utilizes the attributes 114 and various weightings 140, which weightings 140 may be determined in accordance with user or administrative settings of the digital image press 102, whereupon considerations as to the relative importance of the individual attributes 114 are taken to increase or decrease the weight 140 attributable thereto. For example, when a user designates a particular job as a color-critical job, weights 140 corresponding to accuracy are increased while weights 140 associated with ink cost are decreased, indicating that the attribute for accuracy is more important than cost, which will result in a higher combined score 115, as discussed below.

In one embodiment, the combined attribute scoring module 112 may receive a job type indication from a user via the graphical user interface 500. The job type may refer to a submitted print job, having preset attribute weightings 140. For example, the job type may be a "cost-sensitive" print job, such that ink usage is the most important attribute 114, with corresponding increased weightings 140 retrieved from the data storage 130 and corresponding decreased weightings 140 retrieved for the other attributes 114. Similarly, when the job type is a "color critical" job, the accuracy attribute 114 would be the most important such that suitably high weighting 140 for the accuracy attribute 114 is retrieved from the data storage 130 and lower weightings 140 for the remaining attributes 114 are used by the scoring module 112 in computing the respective scores 115 of the various spot color recipes 210, 212.

In accordance with one embodiment, a "higher" combined attribute score may be implemented as the differential score being greater than a user-defined threshold score. That is, let the combined attribute score be X for profile 1, and Y for profile 2, and let T be the aforementioned user-defined threshold, such that if X>Y+T, the recipe corresponding to profile 1 is used by the digital image press 102. For example, if X=10, Y=7, and T=0, using profile 1 will certainly produce a more desired outcome, so the recipe corresponding to profile 1 is selected. If X=10, Y=7, and T=2, using profile 1 will also certainly produce a more desired outcomes, so the recipe corresponding to profile 1 is selected. If X=10, Y=9, and T=2, using profile 1 will not gain much benefit (although X>Y), so the recipe corresponding to profile 2 is selected. Thus, in such an embodiment, rather than merely comparing the combined attribute scores 115 for profile 1 (210) and profile 2 (212), the system employs a user-defined tolerance or cushion prior to utilizing the extended gamut 138 (or the principal gamut 136) depending on the profiles, as will be appreciated by those skilled in the art.

The system 100 may further include a spot color editor module 116 configured to generate a spot editor via a suitable graphical user interface 500, illustrated and discussed below with respect to FIGS. 5A-5D. The instructions 106 may also include a list generating module 118 configured automatically search the data storage 130, particularly the spot color library 134, for those spot colors 202 in a job that benefit from the loaded extended gamut 138, then, automatically resolves those spot colors 202 to utilize the colorants (i.e., toners) of the extended gamut 138, and generate a list thereof for display via the display device 124 and graphical user interface 500. Additionally, if a preponderance of spot colors 202 in a job benefit from a colorant of an extended gamut 138 not loaded, a communication facility is utilized to notify the user.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 120, 122 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIGS. 3-4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The computer system 102 also includes one or more input/output (I/O) interface devices 120 and 122 for communicating with external devices. The I/O interface 120 may communicate with one or more of a display device 124, for displaying information, and a user input device 126, such as a keyboard or touch or writable screen, for inputting text, and/or a cursor control device, such as mouse, trackball, or the like, for communicating user input information and command selections to the processor 104. The various components of the computer system 102 may all be connected by a data/control bus 128. The processor 104 of the computer system 102 is in communication with an associated data storage 130 via a link 132. A suitable communications link 132 may include, for example, the public switched telephone network, a proprietary communications network, infrared, optical, or other suitable wired or wireless data transmission communications. The data storage 130 is capable of implementation on components of the computer system 102, e.g., stored in local memory 108, i.e., on hard drives, virtual drives, or the like, or on remote memory accessible to the computer system 102.

The associated data storage 130 corresponds to any organized collections of data, e.g., spot color libraries 134, spot colors 202, ICC color profiles 204, color descriptions 206, color names 208, standard gamut color recipes 210, extended gamut color recipes 212, cost functions 144, attributes 114, weightings 140, principal gamut 136, extended gamut(s) 138, combined attribute scores 115, destination profiles, and the like, used for one or more purposes. According to one embodiment of the subject application, the extended gamut 138 is selected from a group of gamuts each having a plurality of colorants greater than four, e.g., CMYK+X, CMYK+XY, CMYK+XYZ, CMYK+XYZ . . . , etc. That is, the extended gamut 138 may correspond to a gamut capable of being produced by five, six, seven, eight, or more, process colorants by the digital image press 102.

Furthermore, the extended gamut 138 may be defined in either the same color space as that of the principal gamut 136, or the extended gamut 138 may be defined in a color space that is different from that of the principal gamut 136. In another embodiment, the extended gamut 138 may have the same process colorants as the principal gamut 136, i.e., both are CMYK, and although both are in the same color space, the color gamuts may be different as a result of settings on the digital image press 102, e.g., halftone options, paper-type, paper, etc., or even two different digital image presses/printers. In one embodiment, the data storage 130 may include information relating to the job type selectable by a user. Implementation of the associated data storage 130 is capable of occurring on any mass storage device(s), for example, magnetic storage drives, a hard disk drive, optical storage devices, flash memory devices, or a suitable combination thereof. The associated data storage 130 may be implemented as a component of the computer system 102, e.g., resident in memory 108, or the like.

In one embodiment, the associated data storage 130 may include data corresponding to a spot color library 134, which includes a plurality of spot color profiles 204 representative of various spot colors 202, as illustrated in FIG. 2. With respect to FIG. 2, there is shown a table 200 illustrating International Color Consortium (ICC) profiles 204, used in accordance with various aspects of the subject application. It will be appreciated that the table 200 illustrates an optional embodiment wherein a user may manually, via the graphical user interface 500, control which spot colors 202 may be processed using the extended gamut destination profile (processing means performing a color conversion from PCS to device color space, where PCS values are fixed for each spot color). As shown in FIG. 2, each ICC color profile 204 includes a color description 206, a color name 208, a CMYK spot color recipe 210 and a CMYKX, CMYKXY, CMYKXYZ, CMYKXYZ . . . , etc., (extended gamut) color recipe 212. In one embodiment, the graphical user interface 500 enables the user to elect to utilize the extended gamut recipe 212 via checkboxes 214. However, in accordance with one embodiment described above, and further illustrated below, the system 100 provides automated assistance in spot color 210-212 recipe selection.

As depicted in FIG. 1, the system 100 may include or communicate with one or more user access devices 124, depicted in FIG. 1 as a display device, e.g., a device capable of displaying the graphical user interface 500, which is capable of interacting with the digital image press 102 via a suitable link 150. Display device 124 is representative of any interfacing device, such as an integrated user interface physically coupled to the digital image press 102, or any personal computing device, such as a personal computer, a netbook computer, a laptop computer, a workstation computer, a personal data assistant, a web-enabled cellular telephone, a tablet computer, a proprietary network device, or other web-enabled electronic device. The data communications link 150 between the digital image press 102 and the display device 124 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. When the display device 124 is implemented as a component of the digital image press 102, the communications link 150 may be similar to the bus 128, USB connectivity, HDMI, proprietary connectivity, or the like, enabling the bi-directional communication of data and instructions between the display device 124 and the processor 104 of the digital image press 102.

Although not shown, the display device 124 may include a processor, system memory, system storage, buses that couple various system components including the system memory to the processing unit, and the like. The display device 124 may be suitably configured to interact with the digital image press 102, to access the data storage 130, submit color selections, submit job processing options, display color editors, generate graphical user interface 500, and otherwise interact with users, and the like. In embodiments wherein the display device 124 is separate from the digital image press 102, the display device 124 may include a web-browser, dedicated application, or other thin client interface, e.g., stored in memory, which is operable to interact with the digital image press 102. The thin client may be suitably configured to display the graphical user interface 500 depicted in FIGS. 5A-5D, discussed in greater detail below. It will be appreciated that the processor and memory of such a standalone display device 124 can be configured as set forth above with respect to the processor 104 and memory 108 of the computer system 102.

Figure 3:
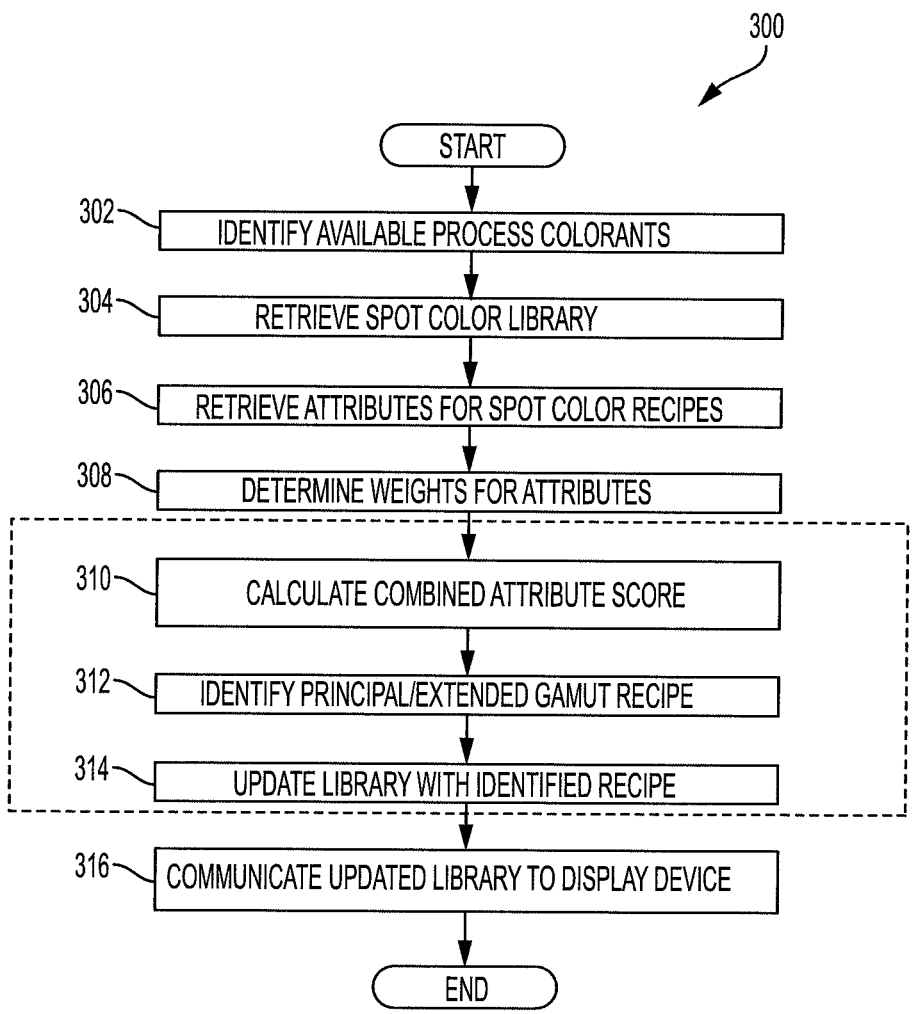
FIG. 3 is a flowchart illustrating operations of the spot color selection system for spot color processing in accordance with one embodiment of the subject application.
Figure 6:
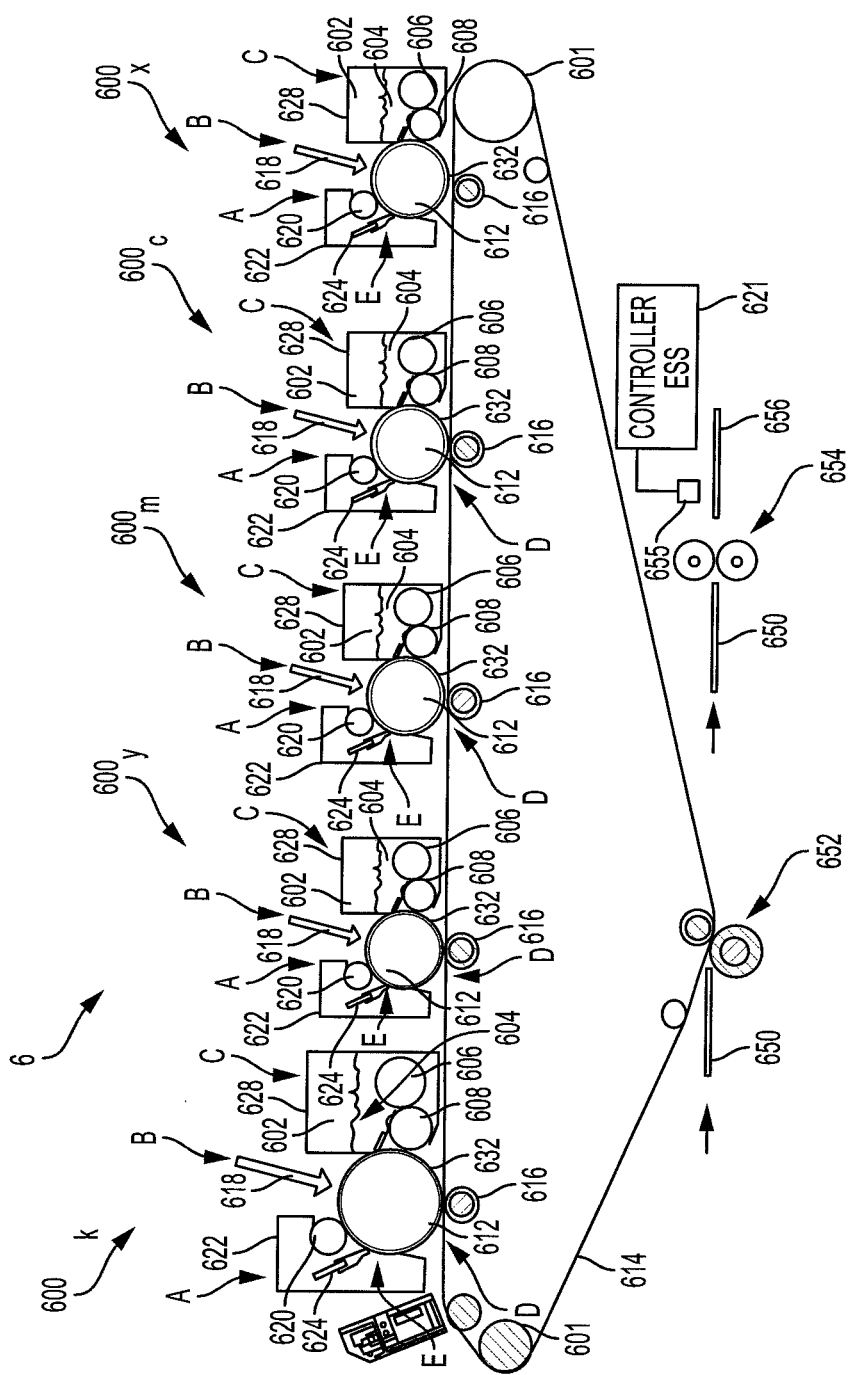
FIG. 6 illustrates a color image forming machine according to an exemplary embodiment of this disclosure employing a digital front end in accordance with one embodiment of the subject application.

Turning now to FIG. 3, there is shown a flowchart 300 illustrating a method for spot color selection according to one embodiment. The methodology of FIG. 3 begins at 302, whereupon the process colorants available in the digital image press 102 are identified so as to determine the principal, i.e., standard gamut 136, and the extended gamut 138. It will be appreciated that the digital image press 102 may comprise cyan, magenta, yellow, black (CMYK—standard) and one or more additional colorants (e.g., CMYKX). FIG. 6, described below, provides an illustration of a multi-colorant digital image press 102 utilizing extended colorants in accordance with one implementation of the subject application.

The processor 104 of the digital image press 102 then retrieves, at 404, the spot color library 134 from the associated data storage 130. In accordance with one embodiment, the spot color library 134 includes, for example and without limitation, spot color recipes 210 (standard colorants) and 212 (extended colorants), ICC profiles 204, spot colors 202, color descriptions 206, color names 208, and the like. At 306, a set of attributes 114 corresponding to the use of colorants by the digital image press 102 is then retrieved from the data storage 130. It will be appreciated that the various attributes 114 may include, for example and without limitation, accuracy, utilization of extended colorant, halftone smoothness, visibility of halftone moiré, ink usage, and the like.

Accuracy may be implemented as a function of the deltaE between the target spot (e.g., Pantone) color 202 to the gamut volume. The further away from the gamut, the smaller the attribute score is. For example, the attribute score will be 0 when the target Pantone is out of the ICC gamut, and the score will be 1 when the target Pantone is in the ICC gamut. It will be appreciated that a more elaborate function may be generated. Utilization of extended colorant, is reflective that the more utilization of extended colorant, the higher the score will be. For example, for a spot color 202, the percentage of the extended colorant in the recipe is 1%, for a score of 0 (because 1% of the extended toner might not produce a significant advantage of using the extended colorant), while 0.01 for 5%, 0.05 for 10%, 0.1 for 20%, 0.9 for 50%, 1 for 80% and up, and so on, utilizing a non-linear (S-shaped) function that emphasizes the advantage of using the extended colorant. In one embodiment, the function may be parameterized and be user-controllable, e.g., via the graphical user interface 500.

It will be appreciated that halftone smoothness is a measurement-based or model-based function that can predict the print smoothness by providing the recipe. The smoother the print is, the higher the score will be. Halftone moiré visibility may be determined as a measurement-based or model-based function that can predict the visibility of the moiré pattern by providing the recipe. The less visible the moiré on the print is, the higher the score will be. Ink usage may be reflective of the cost of extended colorant might be significantly more expensive than the traditional colorants. The attribute score is lower if the more expensive toner is used more.

Returning to FIG. 3, at 308, weights 140 corresponding to the aforementioned attributes 114 are determined via the attribute scoring module 112 implemented by the processor 104 of the digital image press 102, as discussed above. The weights 140 may be determined in accordance with user or administrative settings of the digital image press 102, whereupon considerations as to the relative importance of the individual attributes 114 are taken to increase or decrease the weight attributable thereto. For example, when a user designates a particular job as a color-critical job, weights corresponding to accuracy are increased while weights associated with ink cost are decreased, indicating that the attribute for accuracy is more important than cost, which will result in a higher combined score 115, as discussed below.

At 310, the processor 104 via the scoring module 112 or other suitable component associated with the digital image press 102 (or alternatively the display device 124), calculates a combined attribute score 115 relating to the principal gamut 136 and the extended gamut 138, for each spot color 202 i.e., to the spot color recipes 210-212 pertaining thereto. That is, for each available recipe 210-212, i.e. for the corresponding ICC profiles 204, the scoring module 112 implements the following algorithm to compute a combined attribute score which is consisted of several weighted criteria:

$$A = \Sigma w_i \cdot A_i \quad (1)$$

where $A_i$ (attributes) are:
accuracy,
utilization of extended colorant,
halftone smoothness,
visibility of halftone moire, and
ink usage (cost effectiveness).

At 312, a suitable component of the processor 104, e.g., the processor 104 executing the recipe identification module 110, identifies the extended gamut spot color recipe 212 in response to the extended gamut spot color recipe 212 having a higher combined attribute score 115 than the corresponding principal gamut spot color recipe 210 is used for the reproduction of the corresponding spot color 202. When the principal gamut spot color recipe 210 has the higher combined attribute score, the processor 104, via the recipe identification module 110 in the instructions 106, identifies the principal gamut spot color recipe 210 for use in reproduction of the spot color 202.

At 314, the spot color library 134 is updated in the data storage 130 with the identified principal gamut spot color recipe 210 or extended gamut spot color recipe 212 for subsequent use during document image processing. It will be appreciated that steps 310 through 314 are repeated for each spot color 202 in the spot color library 134. At 316, the updated spot color library 134 is communicated to the display device 124, either coupled to the digital image press 102 or implemented as a user device (workstation, laptop, desktop, mobile device, etc.) for display to an associated user. Preferably, the library 134 is displayed via the graphical user interface 500 (discussed below) for interactions with the user.

Figure 4:
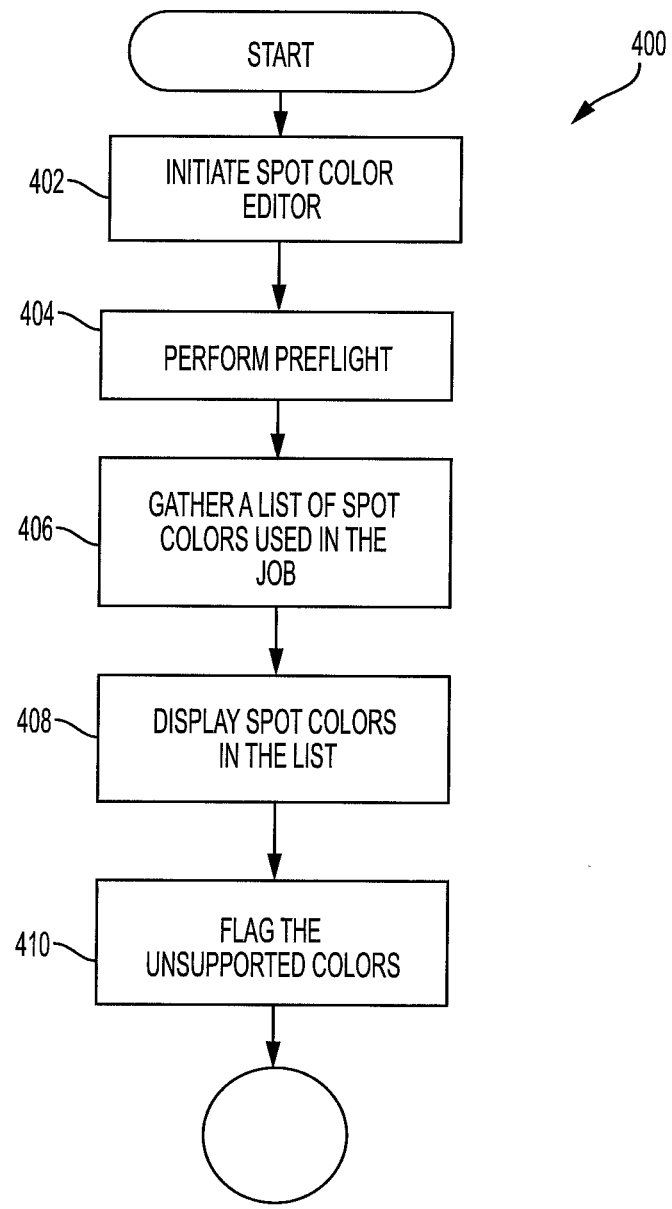
FIG. 4 is a flowchart illustrating operations of a job-based spot editor for use in the spot color selection system for spot color processing in accordance with one embodiment of the subject application.
Figure 5A:
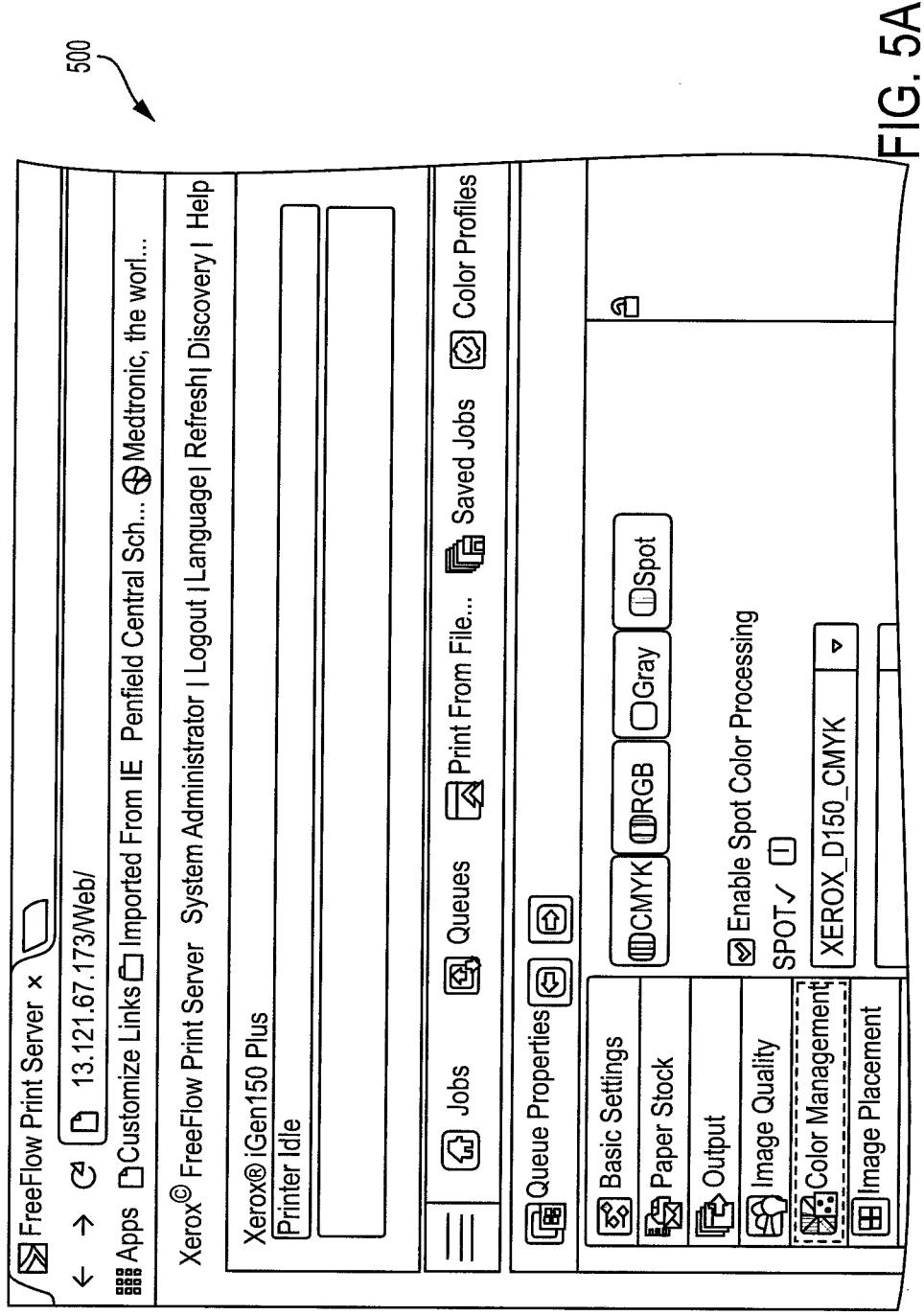
Figure 5B:
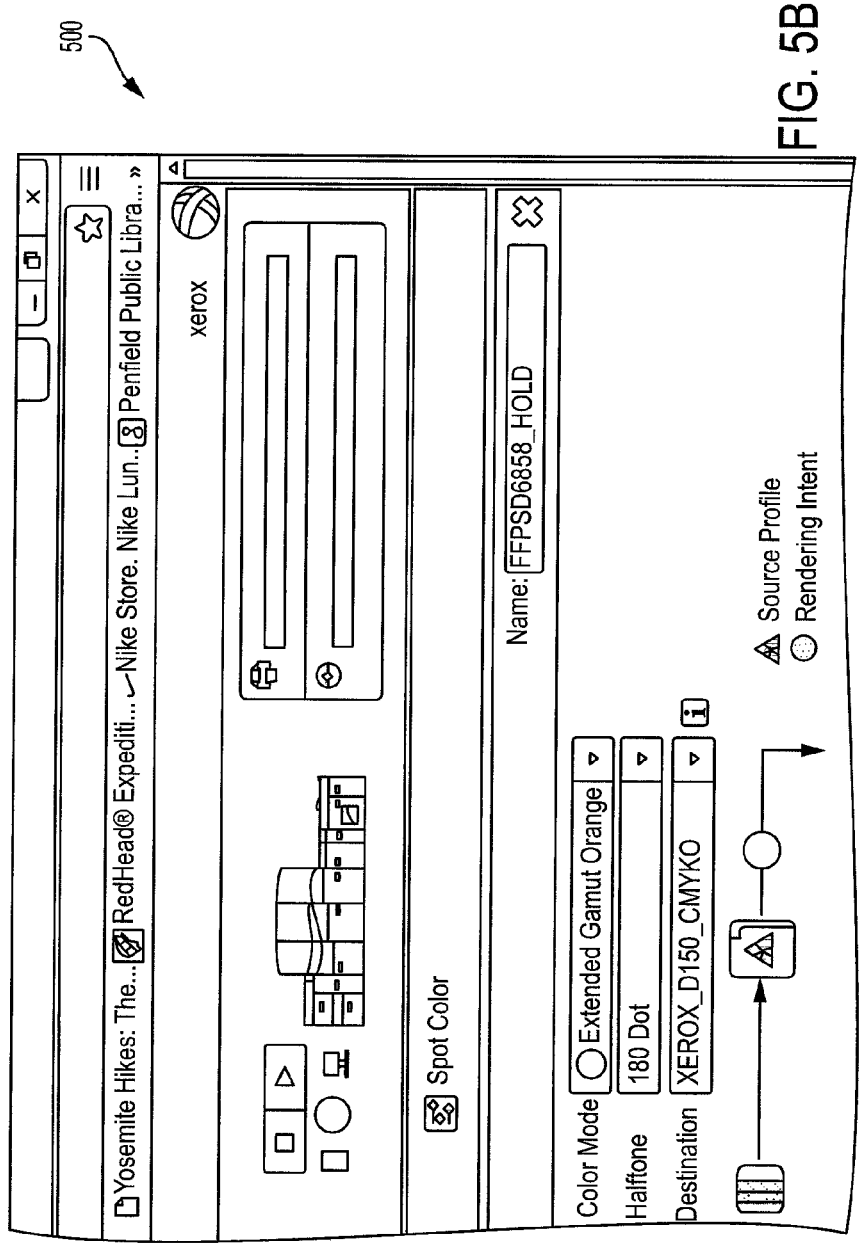

Turning now to FIG. 4, there is shown a flowchart 400 illustrating operations of a job-based spot color editor 116 for use in the spot color selection system 100 for spot color processing in accordance with one embodiment of the subject application. It will be appreciated that the job-based spot color editor 116 may be interactive with the graphical user interface display 500 according to various embodiments contemplated herein.

Operations begin at 402, whereupon the spot color editor 116 is activated by the user. It will be appreciated that such activation may occur via the input devices 126 or graphical user interface 500 of the display device 124 in communication with the digital image press 102. In one embodiment, when the user opens up the spot color editor 116 via the graphical user interface 500 on the display device 124, a list of all spot colors 202 in the spot color library 134 may be displayed, regardless of whether the user is looking at the print queue of the digital image press 102, or the properties of a pending job.

At 404, the digital image press 102 performs preflight operations on a pending print job. It will be appreciated that by utilizing the preflight, a list of the spot colors 202 used in the job are gathered at 406 and communicated to the graphical user interface 500 on the display device 124. That is, a high speed, single constraint (colorant) list search is executed at RIP time on the relevant list of spot colors 202, previously developed (see, e.g., FIG. 3 above), that are known to "benefit" from extended gamut 138. It will be appreciated that as used herein, "benefit" is defined as those spot colors 202 that are external to the CMYK print gamut (principal gamut 136) but fully contained, or close to, the extended gamut 138. In accordance with one embodiment, the list generating module 118, or other suitable component associated with the digital image press 102, automatically searches the data storage 130, particularly the spot color library 134, for those spot colors 202 in a job that benefit from the loaded extended gamut 138, then, automatically resolves those spot colors 202 to utilize the colorants (i.e., toners) of the extended gamut 138. Additionally, if a preponderance of spot colors 202 in a job benefit from a colorant of an extended gamut 138 not loaded, a communication facility is utilized to notify the user. That is, in the event that another toner/colorant would be beneficial to the processing of the job, but that colorant is not loaded in the digital image press 102, the display device 124 or other communications device is communicated with to notify the user to load the additional toner, if available.

Accordingly, the gathering at 406 includes, for example and without limitation, an ability for the user to select, via the graphical user interface 500 displaying the spot color editor 116, an automatic selection of spot colors 202 for the extended gamut 138. During the RIP of a job, a series of spot colors 202 in the job are detected. Each spot color 202 in the spot color library 134 on the data storage 130 is search matched first with the list for extended gamut intersection set (benefit from extended gamut 138). If it is NOT in that set, then, the CMYK value is returned back to the RIP for printing. Those spot colors 202 that are in the list that also match the supported, loaded, extended gamut 138, are returned back to the RIP, with the extended gamut 138 mixture combination CMYKX. The RIP places the extended gamut CMYKX or CMYK, depending on search results, into the result for print thereby, except for cost approval, completely automating the selection of extended gamut 138 colorant and making high speed RIP possible without customer interaction, except, for the approval of the additional cost. In the case where the job contains a preponderance of spot colors 202 that benefit from a not loaded extended gamut 138 colorant, then, the graphical user interface 500, or other communication facility, provides that information to the customer.

In one embodiment, a list, for each supported spot color table, of those spot colors 202 known to be the intersection set of a) CIE L*a*b* spots contained within the extended gamut; and b) CIE L*a*b* spots external to the CMYK print gamut. For example, if Pantone Coated, Toyo, DIC, and Pantone Uncoated are supported spot color tables, then, four lists of the above intersection set would exist in memory 108 and in the data storage 130 via the spot color library 134.

TABLE 1: Example of a Spot Color List Benefitting from CMYKB. Those colors external to the CMYK gamut but within the CMYKB gamut. Section of derived in gamut table example for Colorant Blue within 1.5 dE2k of the Gamut surface:

| PANTONE Yellow 0131 | 93.58 | −6.93 | 37.95 | spotCMYK2Lab | 91.3726 | −7 | 36 |
|---|---|---|---|---|---|---|---|
| PANTONE Black 0961 | 62.94 | 1.66 | 5.65 | spotCMYK2Lab | 63.1373 | 1 | 5 |
| PANTONE 871 | 50 | 1.92 | 23.48 | spotCMYK2Lab | 50.5882 | 1 | 23 |
| PANTONE 872 | 49.11 | 4.53 | 22.98 | spotCMYK2Lab | 49.8039 | 4 | 22 |
| PANTONE 873 | 48.06 | 6.99 | 23.35 | spotCMYK2Lab | 48.2353 | 6 | 23 |
| PANTONE 874 | 49.22 | 8.17 | 22.73 | spotCMYK2Lab | 49.8039 | 8 | 22 |
| PANTONE 875 | 46.71 | 11.24 | 19.22 | spotCMYK2Lab | 47.451 | 11 | 19 |
| PANTONE 876 | 46.12 | 14.92 | 21 | spotCMYK2Lab | 46.6667 | 14 | 21 |
| PANTONE 877 | 58.36 | −0.98 | −1.49 | spotCMYK2Lab | 58.0392 | −1 | −2 |
| PANTONE Dark Blue | 20.84 | 29.17 | −68.5 | spotCMYK2Lab | 21.1765 | 29 | −68 |
| PANTONE Medium Blue | 47.32 | −33.02 | −53.98 | spotCMYK2Lab | 48.2353 | −32 | −52 |
| PANTONE Neutral Black | 13.25 | 0.03 | −0.33 | spotCMYK2Lab | 13.7255 | 0 | −1 |
| PANTONE 100 | 92.04 | −7.56 | 65.76 | spotCMYK2Lab | 90.9804 | −8 | 64 |
| PANTONE 101 | 91.76 | −7.51 | 75.11 | spotCMYK2Lab | 90.5882 | −8 | 74 |
| PANTONE 104 | 63.55 | −0.3 | 70.66 | spotCMYK2Lab | 64.3137 | −1 | 68 |

Returning to FIG. 4, the graphical user interface 500 displays, at 408, those spot colors 202, both supported and non-supported contained within the job, in the aforementioned list. It will be appreciated that previous implementations of color editors do not limit the display of spot colors 202 capable of being produced by an extended gamut printer to only those that correspond to a particular job. At 410, the display device 124 displaying the graphical user interface 500, via the spot color editor 116, flags those un-supported spot colors 202 and generates a notification, via the graphical user interface display device 124, to the associated user for attention. Thereafter, users, via the spot color editor 116 and the graphical user interface 500, may modify those supported spot colors 202 if they need to, or define those un-supported spot colors 202 (otherwise the alternate colors defined in the job will be used for those un-supported spot colors 202). Thereafter, operations with respect to the job continue as will be appreciated by those skilled in the art, e.g., existing workflow continues, editing of the colors, submit job to RIP, output/print job, etc.

It will be appreciated by those skilled in the art the above-identified spot color editor 116 enables users with respect to extended gamut digital image presses, e.g., the digital image press 102 of FIG. 1, to determine, for each spot color 202, whether the extended colorant will be applied or just the conventional CMYK toner. A user may, via the graphical user interface 500, designate a particular job type associated with the print job, such that the spot color editor 116 automatically determines the most important weightings 140 and, via the scoring module 112, facilitates the appropriate reproduction of the print job, i.e., use of spot colors 202 via the principal gamut 136 colorants or the extended gamut 138 colorant(s). As previously discussed, absent the job dependent spot color editor 116 of the digital image press 102, a user would have to perform a manual filtering process on spot colors 202, without having knowledge as to exactly which spot colors are used in the job. It will further be appreciated that the spot color editor 116 limits the display of spot colors 202 for the job property only to the spot colors that are called out in the job. This will save a lot of time for users to look for the specific spot colors 202, and determine which ones will be rendered with the extended gamut colorants, and which ones won't.

Turning now to FIGS. 5A-5D, there is shown an illustration of a graphical user interface 500 for use with the spot color selection system 100 according to one embodiment of the subject application. It will be appreciated that the graphical user interface 500 may be displayed via the display device 124 in communication with the digital image press 102, via a thin client interface of an associated user device (mobile device, desktop, laptop, etc.), or the like. In some embodiments, the graphical user interface 500 is generated on a touch-screen interface coupled to the digital image press 102. As will be appreciated, for extended gamut color modes (e.g., CMYK+Orange, CMYK+Blue, CMYK+Green), selections on the graphical user interface 500 are available for defining the destination profile to be used for CMYK and CMYK+extended color output. Selections on the graphical user interface 500 are added to designate which output is to be used for input source types (e.g., RGB, CMYK and spot). An additional selection is added to the graphical user interface 500 to enable individual spot colors to be rendered with either CMYK or CMYK+extended output. The choices made by the user via the graphical user interface 500 populate job attributes describing the destination profiles to for each source object type. Additionally a list attribute is built containing the names of the spot colors 202 that are to be rendered as the exception cases (as opposed to the majority of the spot color names 208). These job/page attributes direct the RIP process to apply the appropriate color processing.

As shown in FIGS. 5A-5D, the graphical user interface 500 also adds the capability to create a "short-cut" for defining which spot colors 202 get rendered with or without the extended gamut to enable an easier spot color designation process. When a user selects the option of Save for the spot color setup a JSON file is created with the information (see, e.g., FIG. 7). For selection with new queues/jobs, the graphical user interface 500 will filter on the "Mode" information. The user is given an option to save the information along with a name. For subsequent jobs/queues, the user may have the option of selecting the shortcut name or defining the spot colors 202 manually. The saved information may include the associated extended gamut mode at creation time. The choice may only be displayed when the same extended gamut mode is selected.

Inputs received via the graphical user interface 500 populate the job attributes (corresponding to destination profiles) describing each source object type. For example:
Attr_UseDestICCProfile=EdmontonCMYKOrange.icc— for CMYK Source
Attr_UseDestICCprofileRGB=EdmontonCMYK.icc— for RGB source
Attr_UseDestICCprofileGray=EdmontonCMYK.icc— for Gray Source
Attr_UseDestICCprofileSpot=EdmontonCMYK Orange.icc—for spot objects not using CMYK
Attr_UseDestICCprofileSpotCMYK=Edmonton CMYK.icc—for spot objects using CMYK It will be appreciated that the last two attributes are always different, the $1^{st}$ attribute has the same value as either the 4th or 5th attribute. Additionally a list attribute Attr_JSONSpotpointer is built containing the names 208 of the spot colors 202 that are to be rendered as the exception cases (as opposed to the majority of the spot color names 208). An example of such a JSON spot file is shown in FIG. 8.

During RIP processing, the aforementioned job/page attributes direct the RIP process to apply the appropriate color processing. If any of UseICCDestprofile, UseDestICCprofileRGB or UseDestICCprofileG ray [CprofileColorSpcOut information]=CMYK, the RIP context is set to CMYK+Spot. If not, the RIP context is set to CMYK+Extended, and the extended gamut spot color recipe 212 is used. The RIP uses the JSON spotname list to determine how a spot encountered within a job is rendered (e.g., CMYK or CMYK+Orange).

Referring now to FIG. 6, there is illustrated an example image forming machine 6 utilizing multiple process colorants in accordance with one embodiment of the subject application. The image forming machine 6, can be a xerographic or electrophotographic image forming device such as a multi-color digital printer, a digital color copy system, or the like. It includes a plurality of marking engines, depicted in FIG. 6 generally as the developer apparatus 600, forming associated color separations that are combined to form a color print image, as described in further detail below. It will be appreciated that while illustrated in FIG. 6 as a four colorant image forming machine, it will be appreciated that the image forming machine 6 depicted in FIG. 6 may be implemented in having a fifth or sixth process colorant et seq., and the use of a four process colorant device herein is intended for example purposes only. Hereinafter, with respect to FIG. 6, the terms "developer apparatus" and "marking engine" are used interchangeably unless otherwise set forth.

The image forming machine 6 shown by way of example is of a tandem architecture system including an intermediate transfer belt 614 entrained about a plurality of rollers 601 and adapted for movement in a process direction illustrated by arrow 603. Belt 614 is adapted to have transferred thereon a plurality of toner images, which are formed by the developer apparatuses referred to generally at 600.

Each developer apparatus 600 forms an associated color separation by developing a single colorant toner image in succession on the belt 614 so that the combination of the color separations forms a multi-color composite toner image. While the color separations may be combined in different ways, they are each separately developed onto associated photoreceptors and then transferred to a compliant single-pass intermediate belt 614. When all of the desired color separations have been built up on the intermediate belt 614, the entire image is transfixed to substrate, such as paper, to form a print image.

For the purposes of example, which should not be considered limiting, the image forming machine 6 described herein is a CMYKX marking system having five marking engines, i.e., developer apparatuses 600, which include: a cyan developer apparatus $600_C$ forming a cyan color separation; a magenta developer apparatus $600_M$ forming a magenta color separation; a yellow developer apparatus $600_Y$ forming a yellow color separation; a black developer apparatus $600_K$ forming a black separation; and a fifth developer apparatus $600_Z$ forming a fifth color separation, e.g., an orange developer apparatus forming an orange color separation, a violet developer apparatus forming a violet color separation, a blue developer apparatus forming a blue color separation, a green developer apparatus forming a green color separation, or other non-standard colorant developer apparatus forming a color separation of that non-standard colorant. However, it should be appreciated that a larger or smaller number of marking engines 600 can be used. For example, a larger number of marking engines 600 can be used for generating extended colorant set images which typically include these four process-color colorant separations (CMYKX) plus one or more additional color separations such as green, orange, violet, red, blue, white, varnish, light cyan, light magenta, gray, dark yellow, metallics, and so forth.

In other examples, the image forming machine 6 can be an n-color imaging system (with n≥3) having n+1 marking engines 600, where the $n+1^{th}$ marking engine 600oc uses clear toners for form an overcoat layer on top of the other toners in the printed image. In one non-limiting example, an image forming machine may include marking engines $600_{OC}$, $600_C$, $600_M$, $600_Y$ and $600_K$ consecutively coupled to the intermediate transfer belt 614, as will be appreciated.

Each developer apparatus $600_C$, $600_M$, $600_Y$, $600_K$, and $600_X$ includes a charge retentive member in the form of the drum-shaped photoreceptor 612, having a continuous, radially outer charge retentive surface 605 constructed in accordance with well-known manufacturing techniques. The photoreceptor 612 is supported for rotation such that its surface 605 moves in a process direction shown at 603 past a plurality of xerographic processing stations (A-E) in sequence. After initial startup of a particular development apparatus 600K, $600_Y$, $600_M$, $600_C$, $600_X$ successive portions of the photoreceptor surface 632 pass through a first charging station A during operations of the image forming machine 6. At charging station A, a corona discharge device indicated generally at 620, charges portions of the photoreceptor surface 632 to a relatively high, substantially uniform potential during a charging operation.

Next, the charged portions of the photoreceptor surface 632 are advanced through a first exposure station B. At exposure station B, the uniformly charged photoreceptor charge retentive surface 632 is exposed to a scanning device (referenced generally as exposure 618) that causes the charge retentive surface to be discharged forming a latent image of the color separation of the corresponding engine. The scanning device generating the exposure 618 can be a Raster Output Scanner (ROS), non-limiting examples of which can include a Vertical Cavity Surface Emitting Laser (VCSEL), an LED image bar, or other known scanning device. The ROS generating exposure 618 is controlled by a controller 620 to discharge the charge retentive surface in accordance with the digital color image data to form the latent image of the color separation. A non-limiting example of the controller 621 can include an Electronic Subsystem (ESS) shown in FIG. 6, or one or more other physical control devices. The controller 621 may also control the synchronization of the belt movement with the engines $600_C$, $600_M$, $600_Y$, $600_X$ and $600_K$ so that toner images are accurately registered with respect to previously transferred images during transfer from the latter to the former.

The marking engines $600_C$, $600_M$, $600_Y$, $600_X$ and $600_K$ also include a development station C, also referred to as a development housing 628. The development housing 628 includes a chamber 602 holding toner 604. The development housing 628 includes one or more supply rolls 606 for moving the toner 604 into contact with a magnetic brush, roller, or other toner applicator, indicated generally as the developer roll 608 (as shown in FIG. 1), advancing the toner 604 into contact with the electrostatic latent images on the photoreceptor 612 to form the toner image for the associated color separation as controlled by controller 621. The toner 604 not applied to the surface 632 of the photoreceptor 612 is moved to a waste receptacle (not shown) for removal.

At a transfer station D, an electrically biased transfer roll 616 contacting the backside of the intermediate belt 614 serves to effect combined electrostatic and pressure transfer of toner images from the photoreceptor 612 of the developer apparatus 600 to the transfer belt 614. The transfer roll 616 may be biased to a suitable magnitude and polarity so as to electrostatically attract the toner particles from the photoreceptor 612 to the transfer belt 614 to form the toner image of the associated color separation on the transfer belt 614.

After the toner images are transferred from the photoreceptor 612, the residual toner particles carried by the non-image areas on the photoreceptor surface are removed from it at cleaning station E. A cleaning housing 622 supports therewithin a cleaning blade/brushes 624 which remove the toner 604 from the photoreceptor surface 632.

After all of the toner images have been transferred from the engines $600_C$, $600_M$, $600_Y$, $600_X$ and $600_K$ the multi-color composite toner image is transferred to a substrate 650, such as plain paper, by passing through a conventional transfer device 652. The substrate 650 may then be directed to a fuser device 654 to fix the multi-color composite toner image to the substrate to form the color print 656. The fuser device 656 may include a heated fuser roller and a back-up roller (not shown), such that the back-up roller is resiliently urged into engagement with the fuser roller to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets which may be bound to one another. These sets are then advanced to a catch tray for subsequent removal therefrom by the printing machine operator.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for automatic selection of at least one spot color to be processed by a digital image press, the method comprising:
    with a processor, identifying process colorants of the digital image press to determine at least one of a principal gamut and an extended gamut of the digital image press;
    retrieving, from a data storage in communication with the processor, a spot color library of spot color recipes for production of the corresponding spot colors, the spot color recipes corresponding to the at least one of the principal gamut and the extended gamut;
    retrieving a set of attributes corresponding to use of colorants by the digital image press;
    for each spot color recipe:
        calculating a combined attribute score relating to the principal gamut and the extended gamut;
        identifying the spot color recipe of the extended gamut for use by the digital image press in response to the extended gamut spot color recipe having a higher combined attribute score than the corresponding principal gamut spot color recipe,
        identifying the spot color recipe of the principal gamut spot color recipe for use by the digital image press in response to the principal gamut spot color recipe having a higher combined attribute score than the corresponding extended gamut spot color recipe, and
        updating the spot color library in accordance with the identified recipe for production of each spot color; and
    communicating, via a communications link, to a display device, the updated spot color library,
    wherein at least one of identifying, retrieving, calculating, updating, and communicating is performed with the processor of the digital image press.

2. The method of claim 1, wherein the principal gamut corresponds to a four-colorant gamut of the digital image press.

3. The method of claim 2, wherein the extended gamut is selected from a group of gamuts, each of the group of gamuts having a plurality of colorants greater than four, and wherein the extended gamut is capable of being defined in at least one of a same color space as the principal gamut or a color space different from the color space of the principal gamut.

4. The method of claim 3, wherein the combined attribute score of each spot color recipe in the principal gamut and the extended gamut is a sum from a cost function comprising weighted attributes.

5. The method of claim 4, wherein the weighted attributes are selected from the group comprising accuracy, utilization of extended colorant, halftone smoothness, visibility of halftone moiré, and ink usage.

6. The method of claim 5, wherein:
accuracy is determined via a function of the deltaE between a target spot color to the gamut volume, such that the further away from the gamut, the smaller an attribute value will be for the corresponding spot color recipe;
utilization of extended colorant is determined via a non-linear function representative of a percentage of the extended colorant in the corresponding spot color recipe;
halftone smoothness is determined via at least one of a measurement-based or a model-based function for prediction of print smoothness of the corresponding spot color recipe;
visibility of halftone moiré is determined via at least one of a measurement-based or a model-based function for prediction of visibility of a moiré pattern of the corresponding spot color recipe; and
ink usage is determined as a cost associated with use of the extended colorant of the corresponding spot color recipe.

7. The method of claim 5, further comprising:
receiving from a graphical user interface in communication with the processor, selection data corresponding to a job type associated with a document processing job;
retrieving, from the data storage, attribute weightings corresponding to the job type;
applying, to the spot color recipes in the data storage, the retrieved attribute weightings to the corresponding attributes associated therewith so as to calculate the combined attribute score for the spot color recipes;
automatically selecting at least one spot color recipe in accordance with the combined attribute score for use in processing the document processing job; and
outputting the document processing job by the digital image press utilizing the at least one selected spot color recipe.

8. The method of claim 7, further comprising receiving, via a computer network, at least one adjustment using the graphical user interface corresponding to at least one attribute, the at least one adjustment representative of an increase or a decrease in an importance of the at least one attribute, wherein the weight associated with the at least one attribute is increased or decreased in accordance with the corresponding increase or decrease in importance of the at least one attribute.

9. The method of claim 8, further comprising generating, on the graphical user interface, an icon corresponding to a plurality of ICC profiles for at least one spot color for use in at least one of a job or page of a job.

10. The method of claim 8, further comprising:
receiving, via the digital image press, a print job including a plurality of colors;
analyzing the print job to determine whether a preponderance of the plurality of colors in the print job benefit from using the extended gamut; and
generating a notification, via the graphical user interface, in response to a determined benefit.

11. The method of claim 7, wherein the graphical user interface is a spot color editor, further comprising:
receiving at least one edit to a spot color recipe; and
modifying the spot color recipe in accordance with the at least one edit.

12. A system comprising memory storing instructions for performing the method of claim 1, and a processor in communication with the memory executing the instructions.

13. A computer program product comprising a non-transitory recording medium storing instructions, which are executed by a processor of a computer, which causes the computer to perform the method of claim 1.

* * * * *